(12) United States Patent
Knickrehm et al.

(10) Patent No.: US 12,408,645 B2
(45) Date of Patent: Sep. 9, 2025

(54) FISHING FLOAT OR SINKER

(71) Applicant: World Angler Fishing Products, LLC, Boise, ID (US)

(72) Inventors: Matt Knickrehm, Boise, ID (US); Tim Mansell, Boise, ID (US)

(73) Assignee: World Angler Fishing Products, LLC, Boise, ID (US)

( * ) Notice: Subject to any disclaimer, the term of this patent is extended or adjusted under 35 U.S.C. 154(b) by 0 days.

(21) Appl. No.: 17/931,059

(22) Filed: Sep. 9, 2022

(65) Prior Publication Data

US 2023/0075869 A1    Mar. 9, 2023

Related U.S. Application Data

(60) Provisional application No. 63/242,365, filed on Sep. 9, 2021.

(51) Int. Cl.
| | | |
|---|---|---|
| A01K 93/00 | (2006.01) | |
| A01K 87/00 | (2006.01) | |
| A01K 95/00 | (2006.01) | |

(52) U.S. Cl.
CPC ............ *A01K 87/008* (2022.02); *A01K 93/00* (2013.01); *A01K 95/00* (2013.01)

(58) Field of Classification Search
CPC ........ A01K 93/00; A01K 93/02; A01K 95/00; A01K 87/008; A01K 95/005; A01K 95/02; A01K 91/03; A01K 91/04; A01K 91/047

See application file for complete search history.

(56) References Cited

U.S. PATENT DOCUMENTS

| | | | |
|---|---|---|---|
| 3,608,230 A * | 9/1971 | Hribar | A01K 95/00 164/129 |
| 4,194,936 A | 3/1980 | Martuch | |
| 4,205,477 A | 6/1980 | Fajt, Jr. | |
| 4,359,836 A | 11/1982 | Yuji | |
| 4,426,804 A * | 1/1984 | Hutson | A01K 93/00 43/44.91 |
| 4,426,805 A | 1/1984 | Riead | |
| 4,796,377 A | 1/1989 | Hosegood et al. | |
| 5,216,831 A | 6/1993 | Halterman, Jr. | |
| 5,457,909 A * | 10/1995 | Graves | A01K 95/00 43/44.91 |
| 5,459,959 A | 10/1995 | Paradis | |
| 5,575,104 A | 11/1996 | Wilding | |
| 5,758,451 A | 6/1998 | Wolfe | |
| 6,009,659 A | 1/2000 | Shannon et al. | |
| 6,125,574 A | 10/2000 | Ganaja et al. | |

(Continued)

*Primary Examiner* — Peter M Poon
*Assistant Examiner* — Carly W. Lynch
(74) *Attorney, Agent, or Firm* — Scott D. Swanson; Shaver & Swanson, LLP

(57) ABSTRACT

A strike indicator float or sinker having a rigid insert having two opposing hemispherical clamping sections. The sections are joined by a hinge, preferably a living hinge. Each opposing section has an internal face configured for positioning thereon a fishing line. The opposing surfaces form a generally flat section and recessed flat section that are configured for mating engagement. The flat sections may have an overlayment of rubber or molded plastic to increase friction between a fishing line positioned in the opposing flat section. The flat sections provide for lateral adjustability of the fishing line relative to the center of the device.

15 Claims, 9 Drawing Sheets

(56) References Cited

U.S. PATENT DOCUMENTS

| | | |
|---|---|---|
| 6,931,786 B1 | 8/2005 | Bennett |
| 7,003,911 B2 | 2/2006 | Schoenike |
| 7,877,924 B2 | 2/2011 | Schoenike |
| 8,015,745 B2 | 9/2011 | Westover |
| 8,656,634 B2 | 2/2014 | Farley et al. |
| 9,370,174 B2 | 6/2016 | Farley et al. |
| D769,406 S | 10/2016 | Schoenike |
| 2002/0178646 A1* | 12/2002 | Ratte ............... A01K 95/00 43/44.9 |
| 2005/0011109 A1* | 1/2005 | Valentyne ......... A01M 23/26 43/89 |
| 2007/0089354 A1* | 4/2007 | Franolic ............ A01K 95/00 43/44.87 |
| 2007/0294934 A1* | 12/2007 | Myers ............... A01K 93/00 43/41 |
| 2008/0034640 A1 | 2/2008 | Naerheim et al. |
| 2019/0059346 A1 | 2/2019 | Robertson |
| 2022/0312751 A1* | 10/2022 | McGill .............. A01K 91/06 |

* cited by examiner

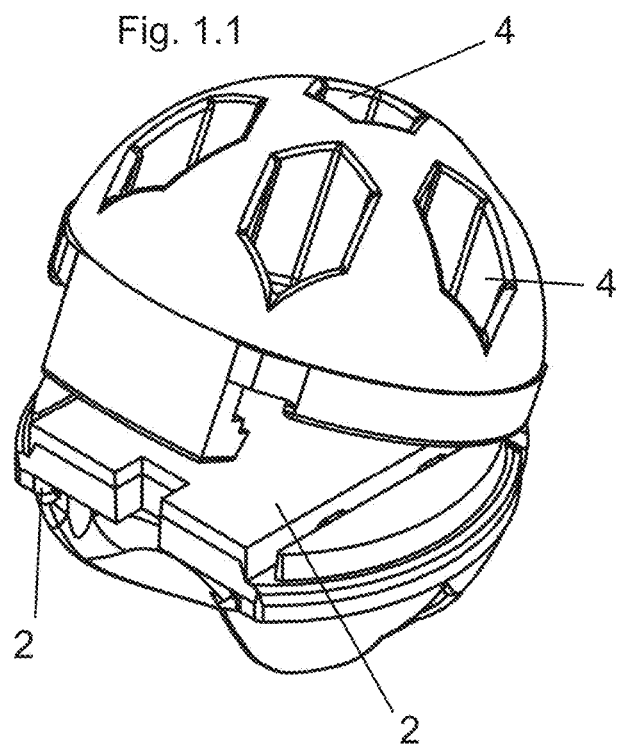
Fig. 1.1
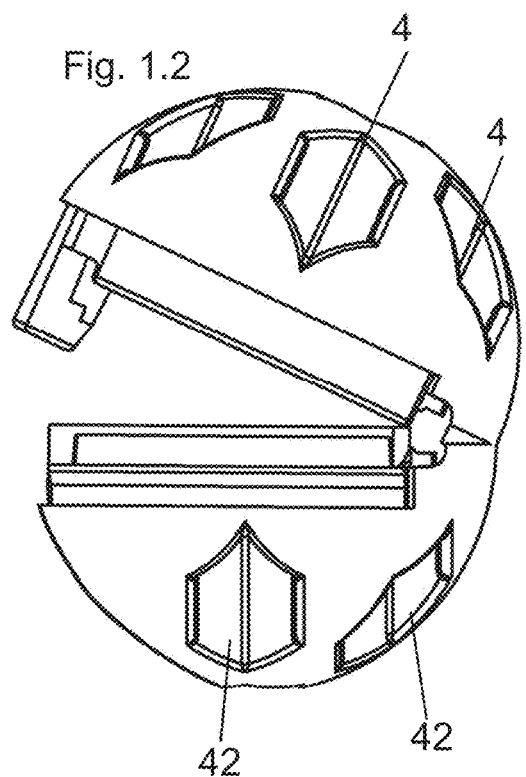
Fig. 1.2
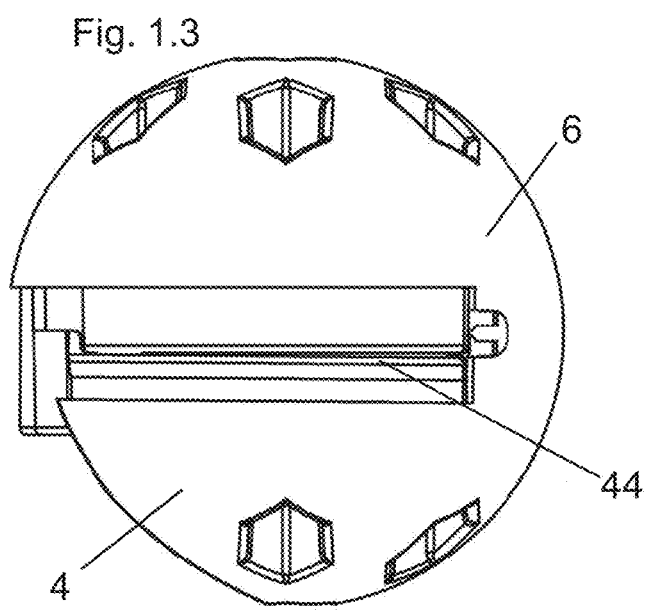
Fig. 1.3

FISHING FLOAT OR SINKER

CROSS-REFERENCE TO RELATED APPLICATIONS

This application claims the benefit of U.S. Provisional Application No. 63/242,365, filed Sep. 9, 2021 the disclosure of which is incorporated by reference.

FIELD OF THE INVENTION

The disclosure generally relates to the field of fishing. Particular embodiments relate to an improved line float or sinker for use in fishing.

BACKGROUND OF THE INVENTION

Fishing is a very popular form of outdoor recreation. Fishing typically utilizes a lure or bait attached at the end of a line. The line can be constructed of monofilament, fluorocarbon, or braided material in conventional fishing or of a specialized line for flyfishing that is connected to a section typically of monofilament or fluorocarbon that leads to a fly. The line extends from a fishing rod that is held by the fisherman and utilized to cast the lure, bait, or fly away from the fisherman into the water. The fishing rod often has a reel for reeling in the fishing line.

The bait, fly or lure can be suspended from the bottom of the water that is being fished. A float is often used to suspend the bait or lure at a desired position. The lure can be drifted with the current of a moving water such as a river, stream, or tidal body of water. Often the action of the fish taking the bait or lure is difficult to detect, in particular in moving water. Accordingly, a float can be utilized as a strike indicator or bobber. The strike indicator or bobber is typically configured to float at or near the water surface. A hesitation of the strike indicator or bobber is typically considered an indication that a fish has taken the bait, lure or fly and the angler then "sets the hook." A variety of mechanisms exist for attaching a strike indicator to a fishing line.

SUMMARY

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is needed is an improved strike indicator that is capable of reuse and securely attaching to the fishing line. What is disclosed is an improved float or strike indicator that is configured for a clamping action on the fishing line. The strike indicator has two opposing hemispheres that are hingedly attached. Preferably the hinge is a living hinge. When the two hemispheres are clamped together, the fishing line is positioned between the two hemispheres with the line positioned between the opposing circular face of each hemisphere. One hemisphere has a face having an elongate protrusion. The opposing face of the opposing hemisphere has an elongate recess configured for mating engagement with the rectangular protrusion. The fishing line is positioned such that elongate flat surfaces of the protrusion and recess compress on the fishing line, providing friction to the device to retain it in position on the line during use. Preferably the protrusion and recess are rectangular in shape so as to extend across the device between the hinge and a clamp that holds the device in the closed or clamped position. This distance is referred to as the length of the protrusion and recess. The protrusion and recess have a width that extends perpendicular to the length and provides a width along which the fishing line is clamped generally parallel to or along the width, which is not required to be precise due to the flat protrusion face and flat face of the recess. The protrusion and recess each are defined by edges which further serve to clamp the line in position by mating engagement with the opposing edges. While a rectangular prism protrusion and corresponding base are depicted, a cylindrical protrusion and corresponding recess can be utilized, or other prism shaped protrusion.

The opposing circular bases are configured for mating engagement such that the fishing line is clamped between the opposing bases. The first base is configured with an elongate flat surface preferably formed in the shape of a rectangle or square and extending from the base of the hemisphere. The opposing section is formed with a shape forming a depression in the surface of the hemisphere. Preferably the mating surfaces are formed of plastic that are affixed to foam sections. Alternatively the mating surfaces can be formed integral with the hemisphere. The figures included herein depict a separate mating surface with the foam or weighted portion formed separately, and subsequently attached.

The mating surfaces are attached by a hinge that allows the opposing hemispheres to open and close. Preferably this hinge is a living hinge. A locking tab is provided that secures the opposing hemispheres in a locking position. The locking tab extends from one of the hemispheres and is configured to latch onto a projection from the opposing hemisphere. Preferably the locking tab is configured with at least one groove to provide a mating depression for the depression. The convex and concave opposing faces of the hemispheres allow the gripping of the line but do not kink the line. The hinged design coupled with the ability to unclamp the indicator, in particular in the ratcheting embodiment, allow the device to be easily adjusted on the line, and decrease the potential for a user dropping the device while adjusting or attaching it to the line.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

BRIEF DESCRIPTION OF DRAWINGS

FIG. 1.1 illustrates a perspective view of the embodiment of FIG. 1 in an open position.

FIG. 1.2 illustrates a side isometric view of a preferred embodiment of the invention in an open position.

FIG. 1.3 illustrates a side isometric view of a preferred embodiment of the invention in a closed position.

DETAILED DESCRIPTION OF THE INVENTION

Figure 1:
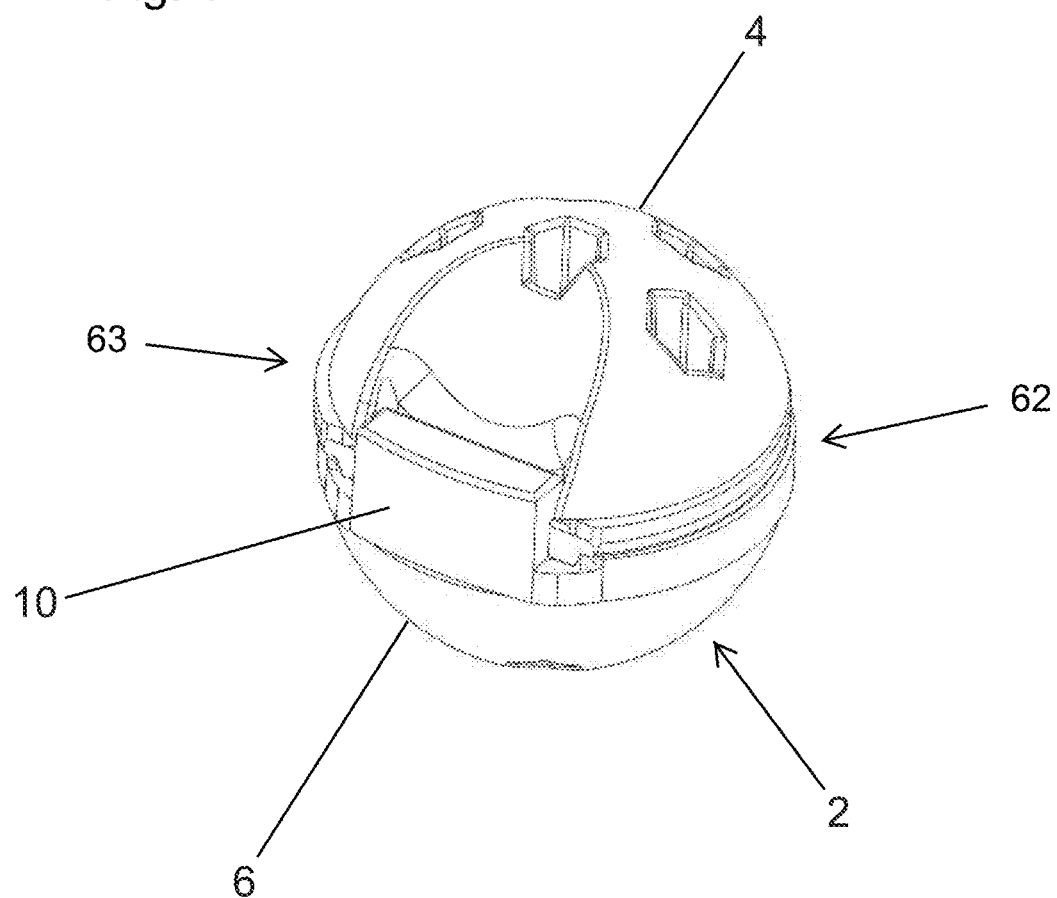
FIG. 1 illustrates a perspective view of a preferred embodiment of the invention in a closed and latched position.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIGS. 1-4 illustrate a preferred embodiment of the invention in which two opposing hemispheres are provided with an insert that forms a hinge and a clamping mechanism. The insert is shown separately in FIGS. 5-8.

Figure 6:
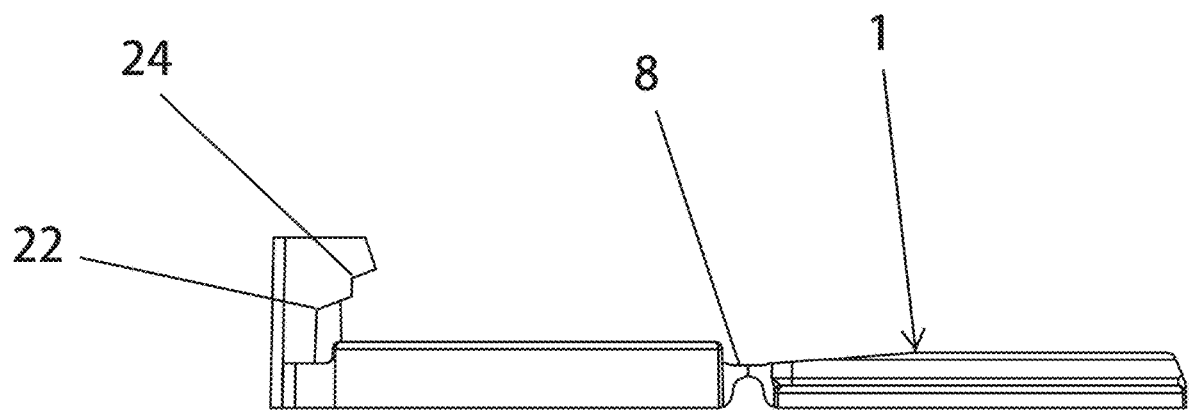
FIG. 6 illustrates a side isometric view of the preferred embodiment of the rigid insert.

FIG. 1 illustrates a perspective view of the preferred embodiment of a strike indicator. The strike indicator 2 is formed in a spherical shape. The spherical shape has an upper hemisphere 4 and lower hemisphere 6 the lower and upper hemisphere are configured to be detachable from one another. A hinge illustrated as reference number 8 and FIG. 6, 7, 8 provides a connection between the upper hemisphere and lower hemisphere. The terms upper and lower are used to show the relative position of the two distinct hemispheres when the strike indicator is shown in the position of FIG. 1. A locking tab 10 secures the upper hemisphere to the lower hemisphere when the two hemisphere are connected. The hinge is preferably a living hinge extending between the upper hemisphere and the lower hemisphere. Preferably the upper hemisphere and the lower hemisphere are constructed of closed cell foam. The upper hemisphere 4 and lower hemisphere 6 are configured with an internal surface that is configured to releasably lock or retain the strike indicator on a fishing line. This line clamping surface 12 of the upper hemisphere is configured from meeting engagement with the line clamping surface 14 of the lower hemisphere.

FIG. 1.1 illustrates a perspective view of a preferred embodiment of the invention having weight reduction features 42 on the lower hemisphere 6. The perspective view illustrates the assembled strike indicator in a partially opened position such that a fishing line can be inserted into the opening formed by the separation of the two hemispheres. The fishing line is positioned across the mating flat surfaces of the insert. The clamping action of the hemispheres retains the fishing line between the two hemispheres such that the fishing line extends in 62 one side and out 63 the second side. The locking tab 10 has a series of indentations on an interior clamping side of the locking tab that provide adjustability to the clamping action of the device. Preferably at least one of the opposing surfaces of the insert is configured with an over molding plastic or rubber to increase the clamping action against the fishing line. This over molded surface allows for further flexibility in fishing line diameters that can be utilized with the device.

FIG. 1.2 illustrates the embodiment of FIGS. 1-1.1 from a side perspective view. The lower hemisphere 6 and the upper hemisphere 4 are shown with weight reduction features 42 in each hemisphere, respectively.

FIG. 1.3 illustrates the device in a clamped or closed position. The locking tab 10 has been clamped or attached to the opposing insert surface. The over molded surface 44 is shown positioned on the clamping surfaces of the two opposing surfaces of the insert.

In the illustrated embodiment of the line clamping surface of the upper hemisphere 12 and line clamping surface of the lower hemisphere 14 are configured such that one is an elongate flat surface extending from the inner surface 16 of the upper hemisphere. The flattened section is configured for mating engagement with a recessed surface 18 of the lower insert. The recessed surface extends inward from the line engagement surface. Preferably the locking tab is configured for ratcheting engagement. The locking tab 10 configured with multiple indentations 22,24 that provide for alternate locking positions of the locking tab on the locking flange 26 of the upper surface. Alternatively the indented surface 18 and the raised surface 12 can be reversed. Preferably the locking tab is configured with two separate locking sections extending from the locking tab. The first section 30 and the second surface 32 are configured for engagement on extensions 34,36 of the locking flange.

In a preferred embodiment shown in the drawings, the elongate depression 18 extends the width of the lower tab. Preferably the raised surface 12 extends the locking surface of the upper hemisphere. The raised section can end in a slanted or sloped section 36 that facilitates placement of the line within the locking surface. The action of the upper locking surface 12 against the lower locking surface 14 serves to clamp or pinch the line between the surfaces 14 and 16, 18 and 12,19 and 21. Alternatively, the foam can be replaced with a weighted or sinking material to allow for the indicator to sink the lure or bait.

Figure 2:
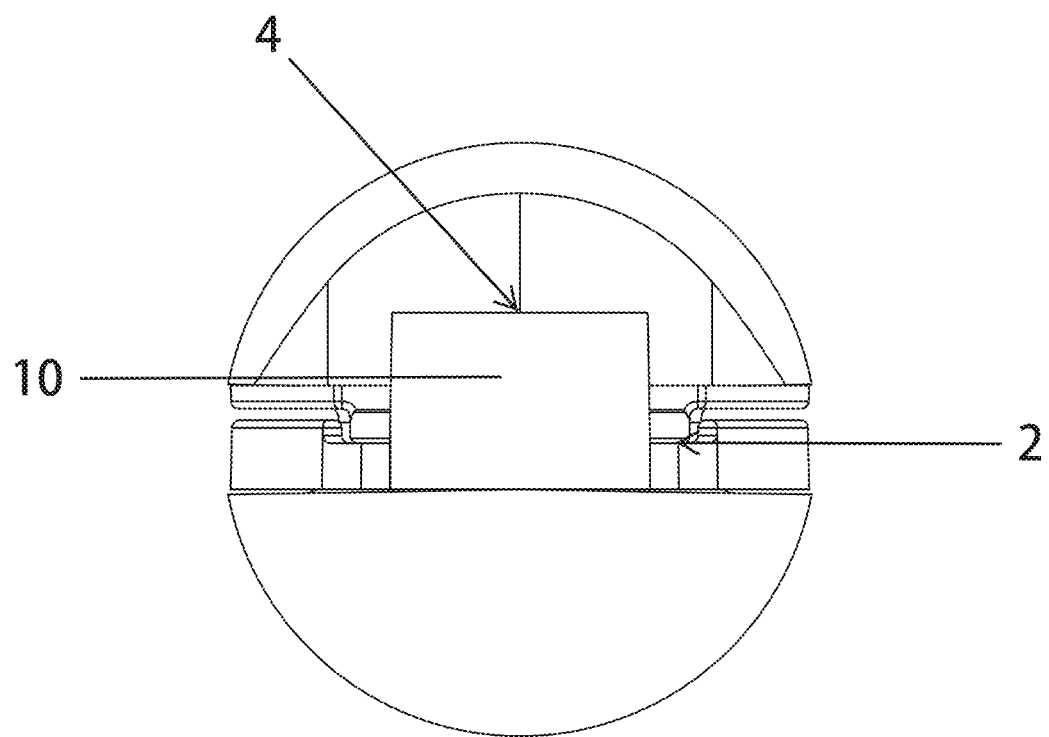
FIG. 2 illustrates a front isometric view of the embodiment of the invention in a closed and latched position.
Figure 3:
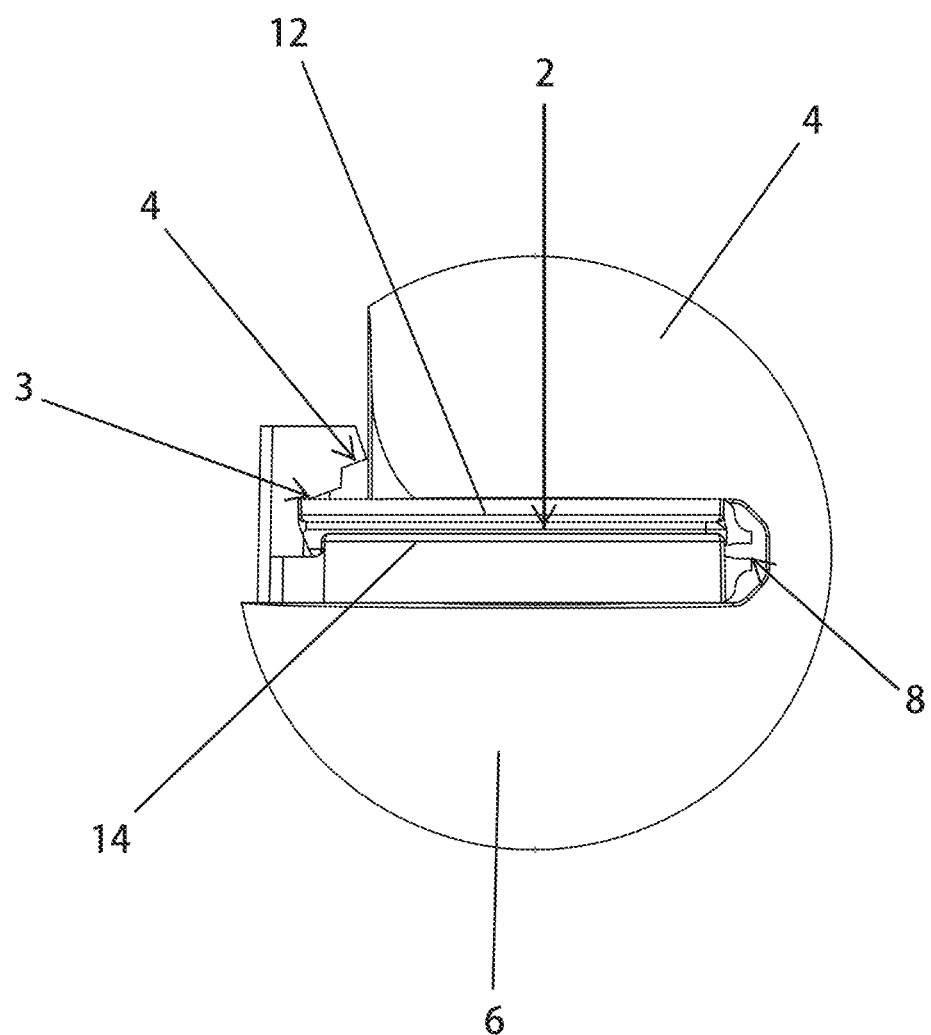
FIG. 3 illustrates a side isometric view of an embodiment of the invention in a closed position.
Figure 4:
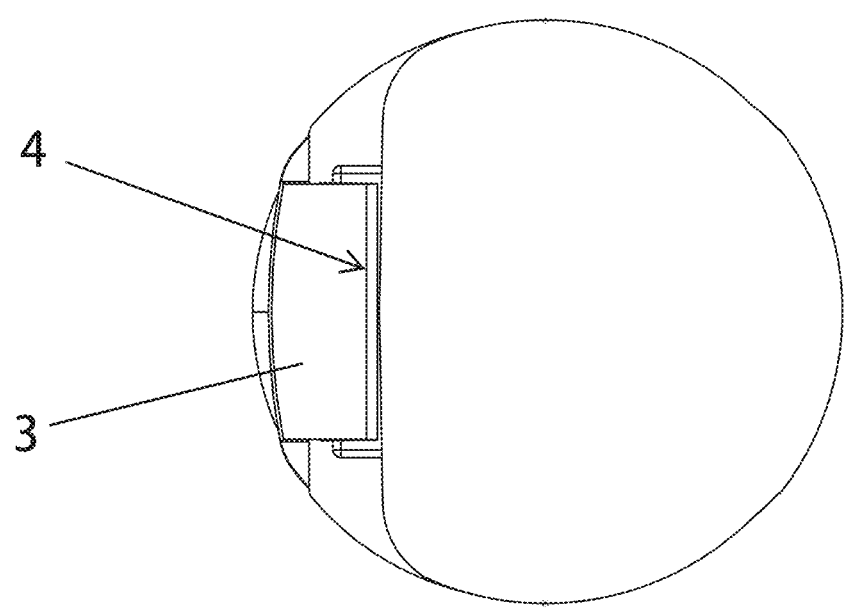
FIG. 4 illustrates a top isometric view of an embodiment of the invention in a closed position.
Figure 5:
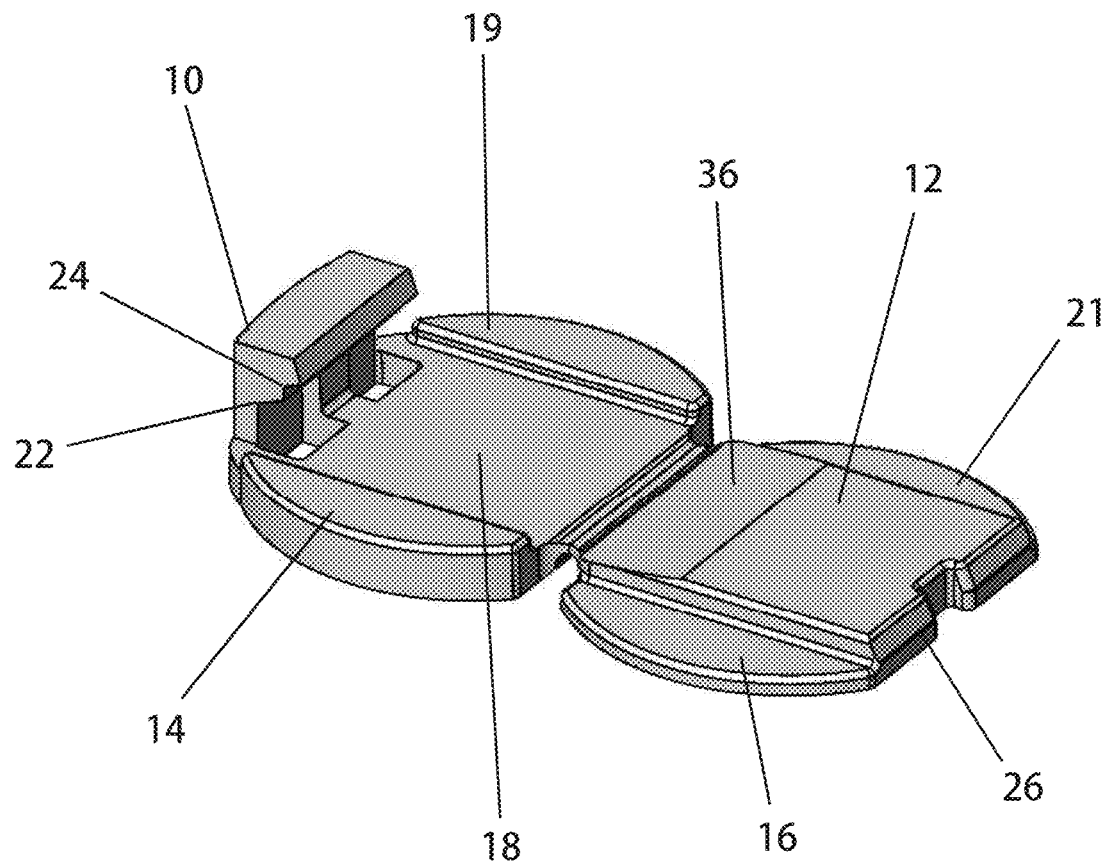
FIG. 5 illustrates a perspective view of an embodiment of the rigid insert of the invention.
Figure 7:
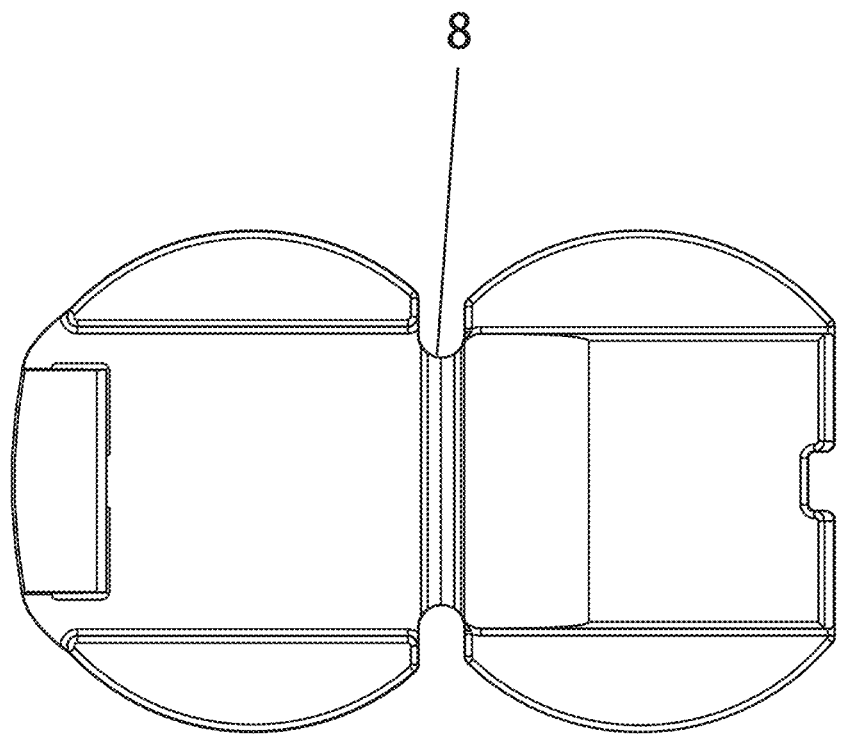
FIG. 7 illustrates a top isometric view of the rigid insert of a preferred embodiment of the invention.
Figure 8:
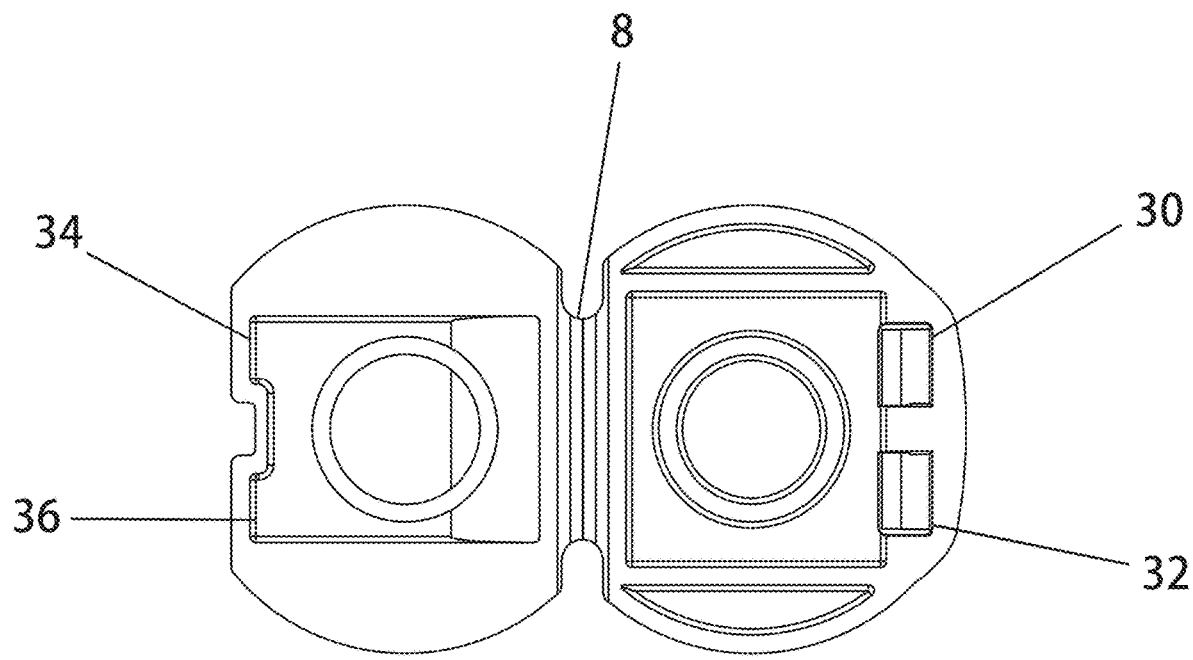
FIG. 8 illustrates a bottom isometric view of a preferred embodiment of the rigid insert of the preferred embodiment of the invention.

FIG. 2 illustrates a side view of the opposing hemispheres forming a sphere with the locking tab 10 retaining the opposing sections together. FIG. 3 is a side view of the opposing hemispheres releasably locked to form a sphere. FIG. 4 is a top view of the opposing hemispheres releasably locked to form a sphere. FIG. 5 is a perspective view of an embodiment of a rigid insert having the clamping mechanism formed separately from the hemispheres. FIG. 5 illustrates the interior sides of the rigid insert. FIG. 6 is a side isometric view of the embodiment of a clamping mechanism of FIG. 5. FIG. 7 is a bottom isometric view of the rigid insert and clamping mechanism of FIG. 5 illustrating the exterior sides of the insert to which the hemispheres are affixed. FIG. 8 is a top isometric view of the rigid insert showing the interior sides of the insert.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A device for attachment to a fishing line, said device comprising:
a spherical body divided along a diametral plane into two opposing hemispheres, wherein said two opposing hemispheres are hingedly connected to hingedly open and close said spherical body from a closed position to an open position, wherein each of said hemispheres comprises an opposing interior face of a pair of opposing interior faces, wherein one of said opposing interior faces comprises an elongate protrusion, wherein the second of said opposing interior faces comprises an elongate recess configured for mating engagement with said elongate protrusion when said hemispheres are in said closed position, wherein said elongate recess and said elongate protrusion are configured for mating engagement such that a fishing line is secured between opposing surfaces of said elongate protrusion and said elongate recess when said spherical body is in said closed position, wherein said opposing surfaces are oriented parallel to the diametral plane of said spherical body when the two hemispheres are in the closed position such that the interior faces are configured to provide lateral adjustability of the fishing line relative to the center of the spherical body and parallel to said diametral plane of said spherical body;
a locking tab connected to one of said hemispheres; and
a locking flange attached to the second of said hemispheres, wherein said locking tab is configured to engage said locking flange to retain said hemispherical portions in said closed position.

2. The device for attachment to a fishing line of claim 1, wherein said elongate protrusion comprises an elongate rectangular protrusion, wherein said elongate recess comprises an elongate rectangular recess.

3. The device for attachment to a fishing line of claim 2, wherein said elongate rectangular protrusion and said elongate rectangular recess comprises a friction enhancing material configured for increasing friction on the fishing line.

4. The device for attachment to a fishing line of claim 3, wherein said friction enhancing material is at least one of a rubber and a thermoplastic elastomer.

5. The device of attachment to a fishing line of claim 3, wherein said friction enhancing material is applied to at least one of said elongate rectangular protrusion and said elongate rectangular recess.

6. The device for attachment to a fishing line of claim 5, wherein said device is configured to float in that said hemispherical portions comprise closed cell foam.

7. The device for attachment to a fishing line of claim 1 wherein said device is configured to float when attached to the fishing line.

8. The device for attachment to a fishing line of claim 1 wherein said device is configured to sink when attached to the fishing line.

9. The device for attachment to a fishing line of claim 1, wherein said locking flange and said locking tab are formed of plastic.

10. The device for attachment to a fishing line of claim 1, wherein said locking flange and said locking tab are integrally formed with said hemispherical sections.

11. The device for attachment to a fishing line of claim 1, wherein said hemispherical sections are hingedly connected by a living hinge.

12. The device for attachment to a fishing line of claim 1, wherein said locking flange and said locking tab comprises a ratcheting clamping mechanism.

13. The device for attachment to a fishing line of claim 12, wherein one of said locking tab or said locking flange comprises a series of indentations and the other of said locking tab or said locking flange
comprises a raised projection, wherein each of said indentations in said series of indentations provides a locking position for said locking tab to provide ratcheting to said locking flange to provide adjustability to the clamping action of the device.

14. The device for attachment to a fishing line of claim 1 wherein said hemispheres are hingedly connected by a rigid insert integral with said hemispheres and comprising a hinge, said elongate protrusion, and said elongate recess.

15. The device for attachment to a fishing line of claim 1 wherein said opposing surfaces are planar.

* * * * *